Patented Jan. 26, 1943

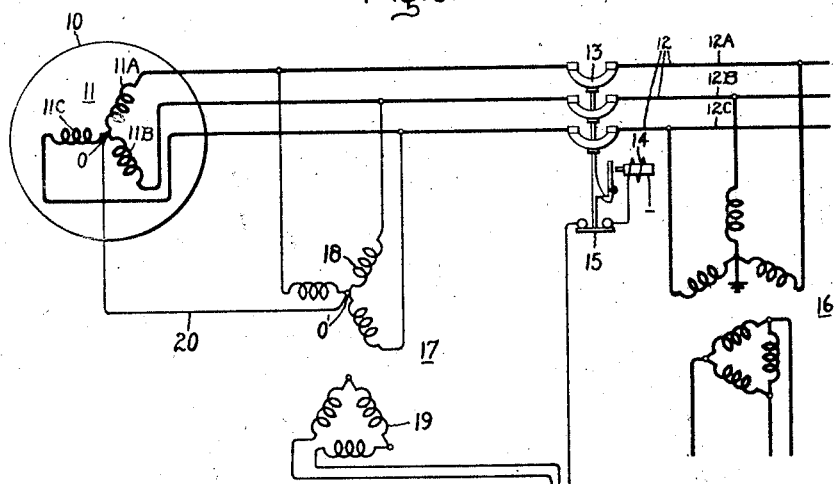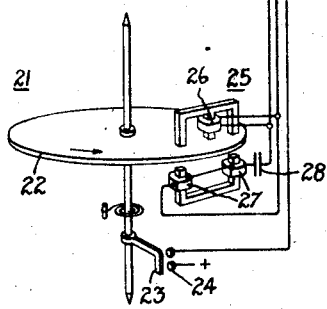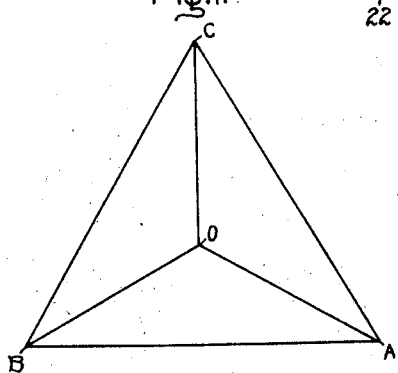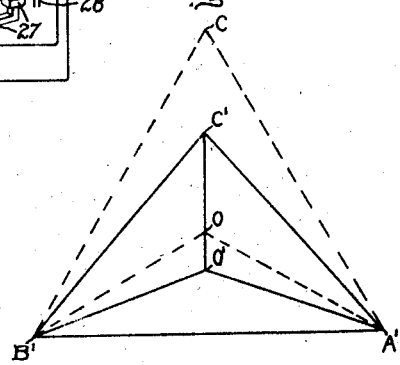
Inventor:
Albert R. van C. Warrington,
by Harry E. Dunham
His Attorney.

2,309,487

UNITED STATES PATENT OFFICE 2,309,487

PROTECTIVE ARRANGEMENT

Albert R. van C. Warrington, Wallingford, Pa., assignor to General Electric Company, a corporation of New York Application January 16, 1941, Serial No. 374,740

5 Claims. (Cl. 175—294)

My invention relates to a protective arrangement for electric translating apparatus and particularly for protection against turn-to-turn faults in alternating-current dynamo-electric machines or transformers.

Turn-to-turn faults often start as a result of defective insulation and permit electrical connection of two points on the same winding which are at different potentials. Because of the low resistance of the short-circuited turns, a large current tends to flow and, unless the translating apparatus is deenergized, very severe fault conditions are likely to occur which will cause considerable damage.

Where the translating apparatus is protected by a differential protective system, it is necessary for the turn-to-turn fault to develop into a phase-to-phase fault or a ground fault before the protective apparatus will function. By the time a phase-to-phase fault or a line-to-ground fault has developed, considerable damage to the translating apparatus will have occurred. It would be desirable to provide a protective arrangement for electric translating apparatus which will detect a turn-to-turn fault on the windings at its inception and cause the operation of a protective system before the fault has developed to the stage of a phase-to-phase or line-to-ground fault which would cause operation of the differential protective system.

Accordingly, it is an object of my invention to provide a new and improved protective system for electric translating apparatus.

It is another object of my invention to provide a turn-to-turn fault protective scheme for electric translating apparatus which will prevent such faults from developing into severe short circuits, which is simple, relatively inexpensive, and positive in operation.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which Figs. 1 and 2 are vector diagrams to explain the theory underlying my invention, and Fig. 3 represents a protective arrangement embodying my invention.

Referring now to the vector diagrams of Figs. 1 and 2, it will be understood by those skilled in the art that, under normal conditions of a polyphase electric translating apparatus, such as a dynamo-electric machine or transformer, having a three-phase Y or star-connected winding, the terminal voltages may be represented by an equi-lateral voltage triangle, such as ABC of Fig. 1, wherein the respective sides of the triangle AB, BC, and CA represent vectorially the symmetrical line-to-line voltages. The center of gravity O of this triangle represents the voltage-zero point of the system which under these balanced conditions is also the neutral point of the translating apparatus. The symmetrical phase voltages of the three-phase Y or star-connected winding may be represented vectorially by AO, BO, and CO in Fig. 1. In the event of a turn-to-turn fault on this star-connected winding, a portion of one of the phase windings is short circuited and, consequently, the short-circuited portion does not participate in producing the phase voltage which it ordinarily would produce under sound conditions. Consequently, if the turn-to-turn fault is on the phase winding C, for example, the phase voltage CO is considerably reduced and, as shown in Fig. 2, the voltage triangle A'B'C' instead of being an equilateral triangle is an isoceles triangle. The center of gravity of isoceles voltage triangle A'B'C' is illustrated at O' and this is again the voltage-zero point of the system. The neutral point O of the translating apparatus, however, does not coincide with the point O' in Fig. 2 under turn-to-turn fault conditions since this neutral point cannot shift due to the constant angular relationship between the phase voltages of the translating apparatus.

The voltage-zero point of any system may be obtained under all conditions by establishing an artificial neutral in a manner well understood by those skilled in the art, such as by connecting a star or Y-connected impedance device across the polyphase circuit in which the star-connected translating apparatus to be protected is included. The artificial neutral and the neutral of the electric translating apparatus will be at the same potential under normal conditions, but, in the case of a turn-to-turn fault, there will exist a potential OO' (Fig. 2) which may be used to control a suitable protective apparatus. The potential OO' between the natural and artificial neutrals is a zero-phase-sequence potential having a frequency like the fundamental frequency of the system.

Although my invention is applicable to any translating apparatus having a Y or star-connected winding, I have illustrated it in Fig. 3 as applied to a dynamo-electric machine, such as a generator 10, having a three-phase Y or star-connected armature winding 11 including phase windings 11A, 11B, and 11C, respectively. The star-connected winding 11 of the translating device or generator 10 is illustrated as connected to a poly-phase bus 12 including three conductors 12A, 12B, and 12C, respectively, through a suitable circuit-interrupting device 13 illustrated as a latched closed circuit breaker having a trip coil 14 and an "a" switch 15 which is closed when the circuit breaker is closed and open when the circuit breaker is open. Electric translating device 10 should be ungrounded so that ground faults on the associated system will not affect the turn-to-turn fault protective scheme to be described hereinafter. If grounding of the system is desired, a suitable grounding bank 16 connected to bus 12 may be provided.

In order to establish an artificial neutral, I have provided a three-phase transformer 17 having a Y-connected primary winding 18 connected to the terminals of armature winding 11 of the electric translating device 10 and a secondary winding 19 illustrated as an open delta winding whose function will be described in greater detail hereinafter. The neutral point O of the winding 11 of electric translating device 10 is interconnected with the neutral point O' of primary winding 18 by a suitable conductor 20. A turn-to-turn fault in one winding of electric translating apparatus 10 will cause a deficiency of electromotive force in that phase, as mentioned above, and create a zero-phase-sequence potential OO' (Fig. 3) between the natural neutral O and the artificial neutral O' of the system. This zero-phase-sequence potential will cause zero-phase-sequence current to flow in conductor 20 as well as in the open delta secondary winding 19 of transformer 17.

In order to open protective circuit breaker 13 in response to such a turn-to-turn fault condition, I have provided an electroresponsive device or fault detecting arrangement generally indicated at 21, which I have illustrated as an induction-disk type of relay, including a movable member such as disk 22. A suitable contactor member 23 adapted to bridge contacts 24 is controlled by movable member or disk 22. Contacts 24 are connected in series with the trip coil 14 and a switch 15 of circuit breaker 13 across a suitable source of potential for energizing trip coil 14 when contacts 24 are bridged by conducting member 23. Movable member or disk 22 is constructed and arranged to operate in response to an electromagnetic motor element 25 arranged to exert a torque on disk 22 which is proportional to the function $I_1 I_2 \sin \theta$, where $I_1$ and $I_2$ are the currents flowing through windings 26 and 27, respectively, of motor element 25 and $\theta$ is the angular displacement between these currents. It will be obvious to those skilled in the art that maximum torque on movable member 22 will be obtained when $\sin \theta$ is equal to unity or, in other words, when the currents $I_1$ and $I_2$ are displaced from one another by ninety electrical degrees.

I have illustrated windings 26 and 27 as energized across the output of the open delta secondary winding 19. It will be obvious to those skilled in the art that, without additional apparatus substantially no torque would be produced on movable element 22 since $\sin \theta$ would equal zero because there would be no phase displacement between the respective currents flowing through windings 26 and 27. In order to accomplish the desired phase displacement, I have provided a capacitor 28 connected in series with windings 27. The capacitive reactance of capacitor 28 should preferably be such as a neutralize the inductive reactance of windings 27 with respect to the zero-phase-sequence potential obtained across the open delta winding 19. By this arrangement, the current $I_2$ flowing through windings 27 and capacitor 28 would be in phase with the zero-phase-sequence voltage obtained across the open delta winding 19 whereas the current flowing through winding 26 would lag this current through windings 27 by substantially ninety electrical degrees if the resistance of winding 26 is very low. As was mentioned above, this ninety-degree relationship produces maximum torque with reference to the movable member or disk 22.

It will be understood by those skilled in the art that a third harmonic potential and multiples of a third harmonic will flow in conductor 20 as a circulating current and, consequently, will produce a third harmonic potential across the output of the open delta winding 19. In the arrangements of the prior art, it was necessary to provide filters for eliminating such undesirable harmonics form affecting the electroresponsive devices. However, in accordance with my invention, electroresponsive device 21 as described above will be substantially unaffected by such third harmonic potentials and, consequently, I can dispense entirely with filter means for eliminating these harmonic potenials. As a matter of fact, the third harmonic and higher harmonic potentials do not affect electroresponsive device 21 for two reasons. In the first place, the windings 27 and a capacitor 28 which are in resonance in so far as the fundamental frequency and, consequently, the zero-phase-sequence frequency of the system is concerned furnish a considerably increased impedance to harmonic currents, thereby reducing the torque due to such harmonic currents to a considerable extent. Secondly, for third harmonics and higher harmonics, such as tooth ripple and the like, the phase displacement between the third harmonic currents flowing in windings 26 and 27 is considerably reduced, whereby the torque on movable member 22 is still further reduced. I have discovered that the relay torque at double frequency is only four per cent of the torque at normal frequency and, consequently, negligible for still higher frequencies. As was mentioned above, this is due to the fact that, as the frequency rises, not only does the tuning with respect to one of the windings of the electroresponsive device 21 deteriorate but the phase shift necessary to produce torque diminishes and, of course, there can be no torque except that due to the interaction of fluxes of like frequency.

The operation of my protective system will be obvious to those skilled in the art in view of the detailed description above. Whenever a turn-to-turn fault exists on the winding 11 of electric translating apparatus 10, a zero-phase-sequence potential will exist across the output of open-delta winding 19 of transformer 17. This potential applied to electromagnetic motor element 25 will cause a torque to be exerted on movable member 22 in a clockwise direction so that contacts 24 are bridged by conducting member 23. This completes the energization circuit of trip coil 14 and tripping of circuit breaker 13 results.

The protective apparatus of my invention will function on incipient turn-to-turn faults and it will not be necessary to permit such faults to develop into phase-to-phase or phase-to-ground faults before the protective system begins to function. Furthermore, with my invention, it is unnecessary to provide filters or blocking means for preventing the third or higher harmonics from affecting the electro-responsive device or relay 21 since the latter inherently does not respond thereto.

While I have shown and described a particular embodiment of my invention, I do not desire to be limited to the exact arrangement shown but seek to cover in the appended claims all those modifications which fall within the true spirit and scope of my invention.

What I claim as new and desire to secure by Letters Patent of the United States is:

1. In combination with a polyphase translating apparatus having a star-connected winding subject to turn-to-turn faults thereon, an electric circuit, means including an electric circuit interrupter for interconnecting said star-connected winding and said circuit, a star-connected inductive device connected across the terminals of said winding so that a zero-phase-sequence potential appears between the neutrals of said winding and inductive device under turn-to-turn fault conditions, an electroresponsive device of the induction type having a movable member for controlling the operation of said circuit interrupter and a motor element for producing a torque on said movable member, said motor element comprising a pair of parallel connected windings and a phase-shifting capacitor connected in series with one of said windings so as substantially to neutralize the inductive reactance of said one winding at normal frequency, and means associated with said inductive device for operating said motor element in response to said zero-phase-sequence potential to cause opening of said circuit-interrupting device upon the occurrence of turn-to-turn fault conditions on said winding.

2. In combination with a polyphase translating apparatus having a star-connected winding subject to turn-to-turn faults thereon, an electric circuit, means including an electric circuit interrupter for interconnecting said star-connected winding and said circuit, a potential transformer having a star-connected primary connected across the terminals of said winding and an open delta secondary so constructed and arranged that a zero-phase-sequence potential appears across said open delta under turn-to-turn fault conditions, an electroresponsive device of the induction type having a movable member for controlling the operation of said circuit interrupter and a motor element for producing a torque on said movable member, said motor element comprising a pair of parallel connected windings and a phase-shifting capacitor connected in series with one of said windings so as substantially to neutralize the inductive reactance of said one winding at normal frequency, and means associated with said potential transformer secondary for operating said motor element in response to said zero-phase-sequence potential to cause opening of said circuit-interrupting device upon the occurrence of turn-to-turn fault conditions on said winding, the resonant circuit of said motor element comprising said one winding and said capacitor being arranged to prevent operation of said electroresponsive device on harmonic zero-sequence potentials generated in said translating apparatus.

3. In combination with a polyphase translating apparatus, an electric circuit, means including an electric circuit interrupter for interconnecting said apparatus and said circuit, an electroresponsive device of the induction type having a movable member for controlling the operation of said circuit interrupter under fault conditions producing a zero-phase-sequence potential in said translating apparatus, a motor element for producing torque on said movable element comprising a pair of parallel connected windings and a phase-shifting capacitor connected in series with one of said windings so as substantially to neutralize the inductive reactance of said one winding at the system frequency, and means for operating said motor element in response to said zero-phase-sequence potential to cause opening of said circuit-interrupting device upon the occurrence of fault conditions in said translating apparatus producing zero-phase-sequence potentials of system frequency, the resonant circuit of said motor element comprising said one winding and said capacitor being arranged to prevent operation of said electroresponsive device on harmonic zero sequence potentials generated in said translating apparatus.

4. A turn-to-turn fault-detecting arrangement for a star-connected electric translating device connected to a polyphase circuit comprising a detecting device having a movable member and a motor element for moving said member comprising a pair of parallel connected cooperating torque-producing windings and phase-shifting means connected in circuit with one of said windings so as to establish a predetermined phase relationship between the currents in said windings, and means for impressing across the circuit of each winding a potential proportional to the potential difference between the neutral points of said circuit and said translating device.

5. A turn-to-turn fault-detecting arrangement for a star-connected electric translating device connected to a polyphase circuit comprising a detecting device having a movable member and a motor element for moving said member comprising a pair of parallel connected cooperating torque-producing windings, a capacitor connected in series with one of said windings so as to provide a resonant circuit at the fundamental frequency at which said electric translating device operates, said capacitor also being provided to establish a predetermined phase relationship between the currents in said windings, means for impressing across the circuit of each winding a potential proportional to the potential difference between the neutral points of said circuit and said translating device, said capacitor cooperating to render said detecting device ineffective on potentials other than those of fundamental frequency.

ALBERT R. van C. WARRINGTON.